United States Patent [19]

Scales, III et al.

[11] Patent Number: 4,816,997
[45] Date of Patent: Mar. 28, 1989

[54] BUS MASTER HAVING SELECTIVE BURST DEFERRAL

[75] Inventors: Hunter L. Scales, III, Austin; William C. Moyer, Dripping Springs, both of Tex.; William D. Wilson, Redwood City, Calif.

[73] Assignee: Motorola, Inc., Schaumburg, Ill.

[21] Appl. No.: 99,359

[22] Filed: Sep. 21, 1987

[51] Int. Cl.⁴ .................................. G06F 12/08
[52] U.S. Cl. .................. 364/200; 364/243.41; 364/246.1
[58] Field of Search ... 364/200 MS File, 900 MS File

[56] References Cited

U.S. PATENT DOCUMENTS 4,370,712 1/1983 Johnson et al. .................. 364/200
4,558,429 12/1985 Barlow et al. .................. 364/900
4,564,899 1/1986 Holly et al. .................... 364/200

Primary Examiner—Thomas M. Heckler
Attorney, Agent, or Firm—Robert L. King; Jeffrey Van Meyers

[57] ABSTRACT

A data processing system having a bus master, a cache, and a memory which is capable of transferring operands in bursts in response to a burst request signal provided by the bus master. The bus master will provide the burst request signal to the memory in order to fill a line in the cache only if there are no valid entries in that cache line. If a requested operand spans two cache lines, the bus master will defer the burst request signal until the end of the transfer of that operand, so that only the second cache line will be burst filled.

2 Claims, 4 Drawing Sheets

WHERE:
BRST = BURST START
BREQ = BURST REQUEST
BACK = BURST ACKNOWLEDGE
TERM = TERMINATE CYCLE

BUS MASTER HAVING SELECTIVE BURST DEFERRAL

FIELD OF THE INVENTION

The subject invention relates generally to bus masters and, more particularly, to a bus master having a burst transfer mode of operation.

BACKGROUND ART

In most integrated circuit memory devices, each storage cell is individually accessed using a unique access address. However, in some integrated circuit memory devices, several other storage cells are accessed simultaneously and the contents thereof are held temporarily in a buffer. Typically, the access addresses of these "extra" storage cells differ from the original access address by only one or two bits. However, subsequent accesses to these cells can be accomplished by simply executing additional access cycles without changing the access address. In the art, such memories are referred to as "nibble mode". In some other integrated circuit memories, a portion of the original access address can be "assumed" for one (or more) subsequent accesses, so that only the least significant portion of the address needs to be decoded, etc. Thus, once the original access has been completed, subsequent accesses to "related" storage cells will be significantly quicker. These types of memories are sometimes referred to as "column mode" or "static column". In memory systems constructed using such enhanced performance memory devices, the effect is to allow the memory to sustain rapid transfers of several operands in "bursts" of m, where m is two (2) to the n power, n being an integer and characteristic of the selected memory device.

In systems having caches, this burst mode of operation facilitates fast filling of entire cache lines. However, the burst operation should only be initiated if all of the entries in the cache line are invalid. Similarly, a burst operation should not be initiated if further data processing must be delayed in order to cache the nonessential entries in a cache line.

SUMMARY OF THE INVENTION

Accordingly, it is an object of the present invention to provide a bus master having a burst mode which is selectively deferred.

These and other objects are achieved in a bus master for use with a memory capable of transferring operands in bursts in response to a burst request signal provided by the bus master. In the preferred form, the bus master includes a cache for storing a plurality of the operands in each of a plurality of cache lines; cache control logic for accessing the cache to determine if a selected operand is stored in the cache, and providing a cache hit signal if the selected operand is stored in the cache; burst deferral logic for determining that an operand to be transferred will span a plurality of the cache lines, and providing a burst deferral signal in response thereto; and burst control means for providing the burst request signal to the memory unless the cache control logic provides the cache hit signal or the burst deferral logic provides the burst deferral signal.

DESCRIPTION OF THE INVENTION

Figure 1:
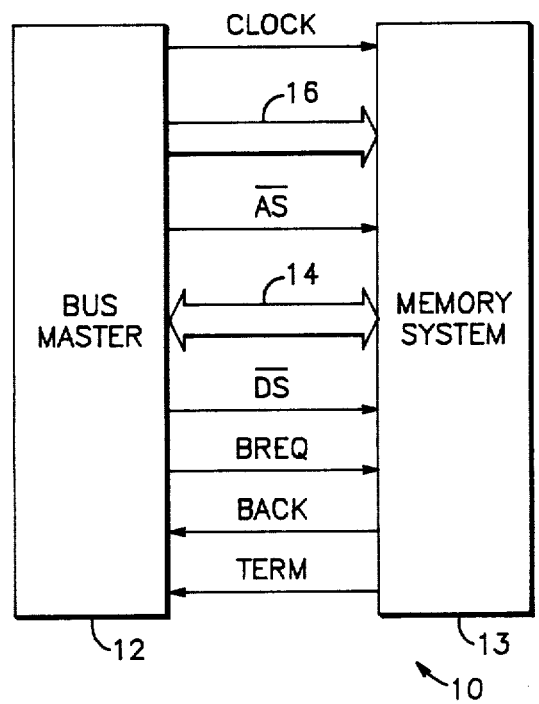
FIG. 1 illustrates in block diagram form, a data processing system having a bus master constructed in accordance with the present invention.
Figure 2:
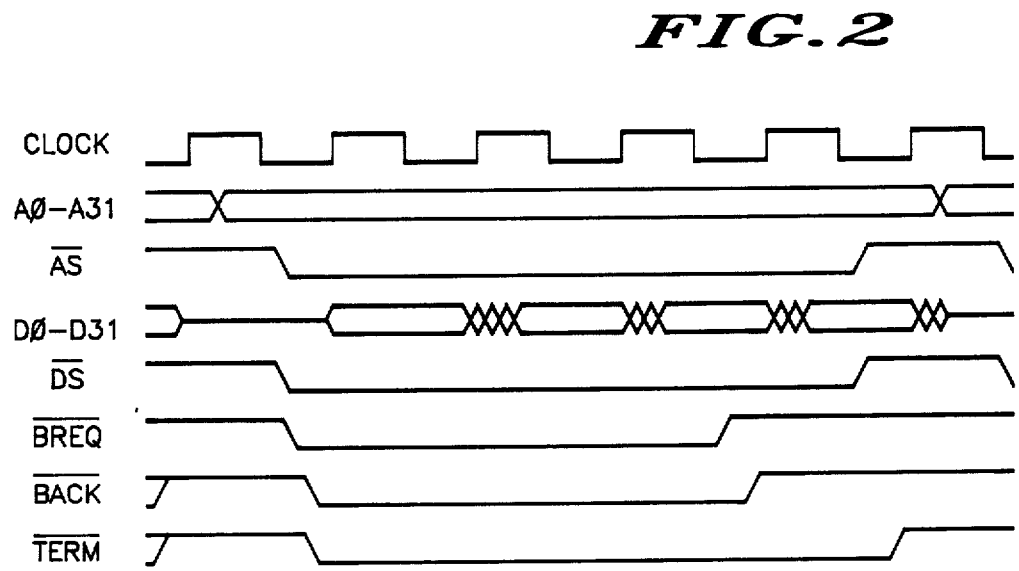
FIG. 2 illustrates in timing diagram form, the operation of the data processing system shown in FIG. 1.

Shown in FIG. 1 is a data processing system 10 comprising a bus master 12 and a memory system 13 which is capable of transferring operands via a data bus 14 in bursts of m in response to a burst request (BREQ) signal provided by the bus master 12, the operands being clustered modulo m about a selected access address provided by the bus master 12 via an address bus 16, where m is two (2) to the n power, n being an integer and characteristic of the memory 13. A timing diagram illustrating the timing and protocol for such a burst transfer is shown in FIG. 2.

Figure 3:
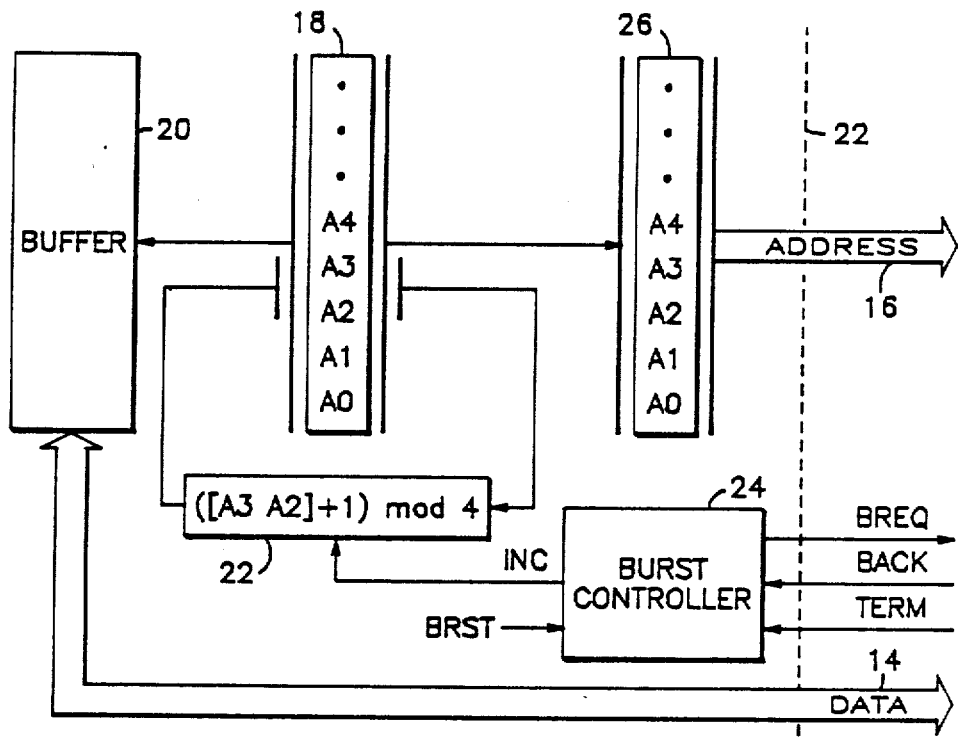
FIG. 3 illustrates in block diagram form, the preferred form of the burst control logic of the bus master shown in FIG. 1.

In the preferred embodiment of the bus master 12 shown in FIG. 3, an address register 18 stores the access address for each operand which is to be transferred between the memory 13 and a buffer 20. A modulo-m adder 22 is provided to increment, modulo m, an appropriate set n of the bits of the access address stored in the address register 18, in response to an increment (INC) signal provided by a burst controller 24.

Figure 5:
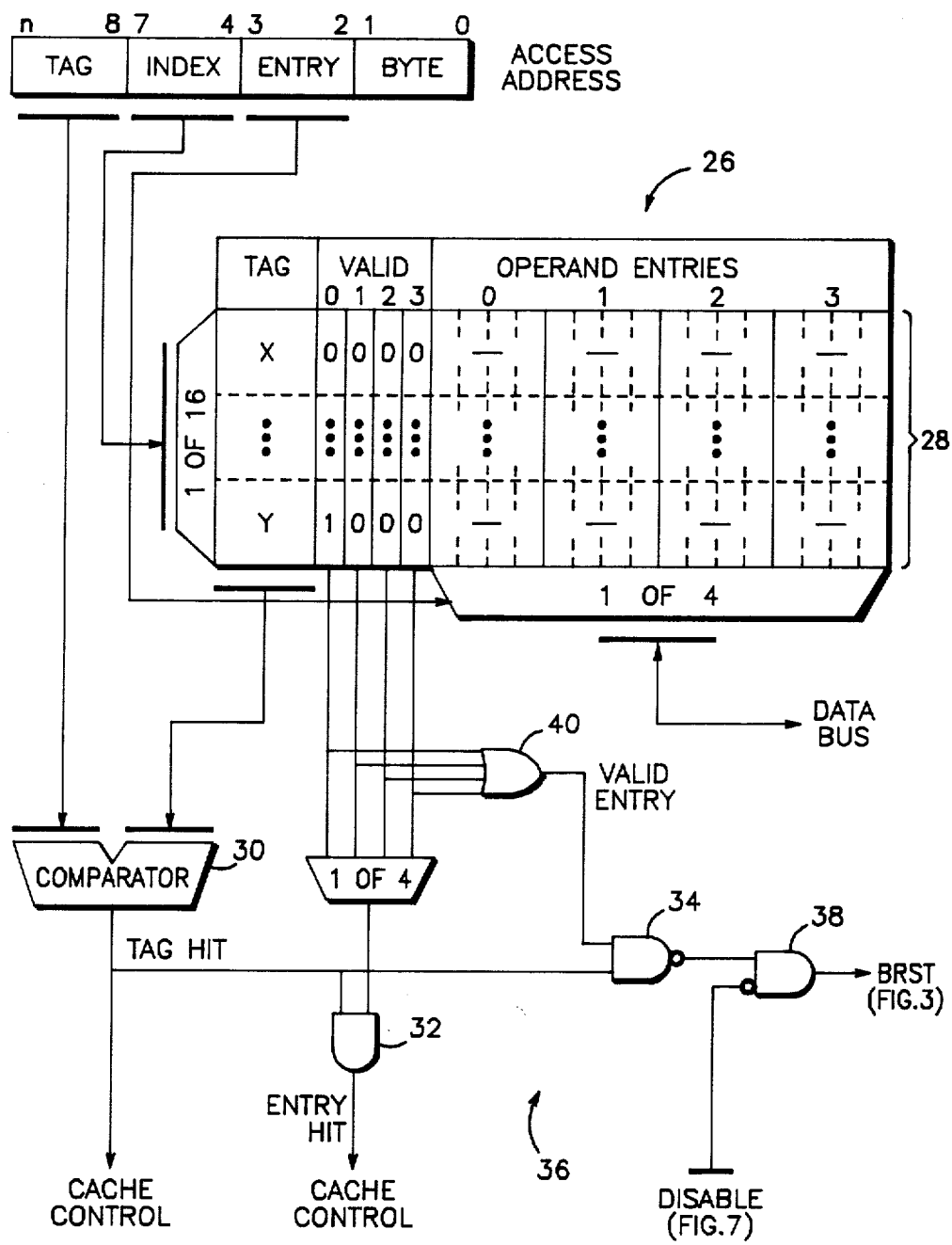
FIG. 5 illustrates the preferred form of the burst initiation logic.

In response to a burst start (BRST) signal provided by the burst initiation logic 36 shown in FIG. 5, the burst controller 24 will initially provide the BREQ signal to indicate to the memory 13 that the bus master 12 wishes for the memory 13 to continue after the current access cycle with the next operand in the burst. If at the end of the current access cycle the memory 13 decides that it can "burst" the next operand, it will so indicate by providing, substantially simultaneously, both a burst acknowledge (BACK) signal and a cycle termination (TERM) signal; otherwise, it simply provides the TERM signal.

Figure 4:
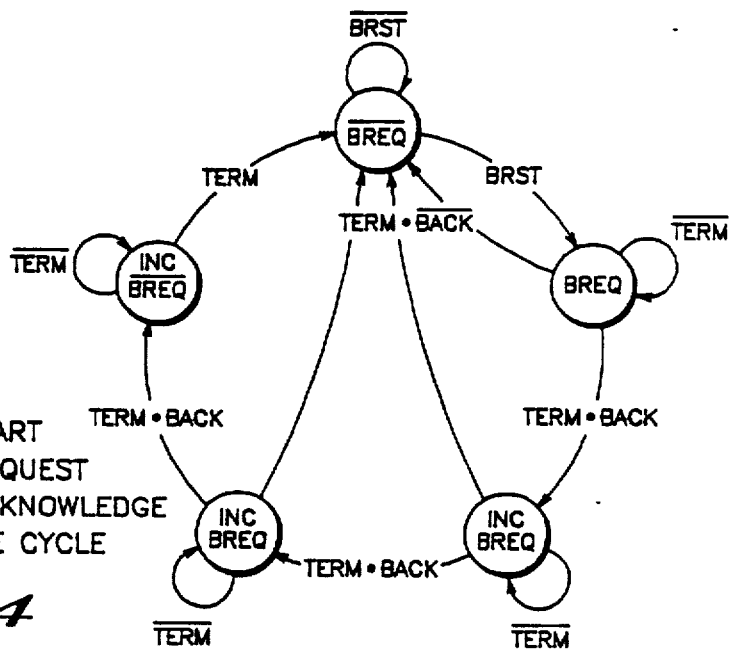
FIG. 4 illustrates in state diagram form, the operation of the burst controller of the bus master shown in FIG. 3.

In response to receiving both the BACK and the TERM signals, the burst controller 24 will again provide the BREQ signal to the memory 13. In addition, the burst controller 24 will provide, substantially simultaneously, the INC signal to the adder 22 to "sequence" the access address stored in the address register 18. In response to receiving just the TERM signal or after m−1 operands have been burst transferred, the burst controller 24 will cease to provide either the BREQ or the INC signals. FIG. 4 illustrates in state diagram form the operation of the burst controller 24.

Shown in FIG. 5 is a set associative cache 26 of conventional form, which stores in each of a plurality of cache lines 28, a set of operands, an address tag (TAG) common to each of the operands in the cache line 28, and a set of valid (VALID) bits, each of which when SET indicates the validity of a respective one of the operands in the cache line 28. In general, the cache 26 is accessed in a conventional manner using tag (TAG), index (INDEX) and entry select (ENTRY) portions of an access address (ACCESS ADDRESS). If the address TAG of the INDEXed cache line 28 is the same as the TAG portion of the selected ACCESS ADDRESS, a TAG COMPARATOR 30 will provide a TAG HIT signal. Substantially simultaneously, if the VALID bit for the selected ENTRY in the INDEXed cache line 28 is SET, AND gate 32 will provide an ENTRY HIT signal. The TAG HIT and ENTRY HIT signals are used by cache control logic (not shown) to determine if an operand having the selected ACCESS ADDRESS is in the cache 26.

In response to the TAG HIT signal, a NAND gate 34 in the burst initiation logic 36 will disable an AND gate 38 to prevent the burst start BRST signal (FIG. 3). NAND gate 34 will also disable AND gate 38 in response to a VALID ENTRY signal provided by an OR gate 40 if any of the VALID bits in the INDEXed cache line 28 are SET. Thus, the BRST signal will be provided by the AND gate 38 only if there is neither a TAG HIT signal nor a VALID ENTRY signal.

Figure 6:
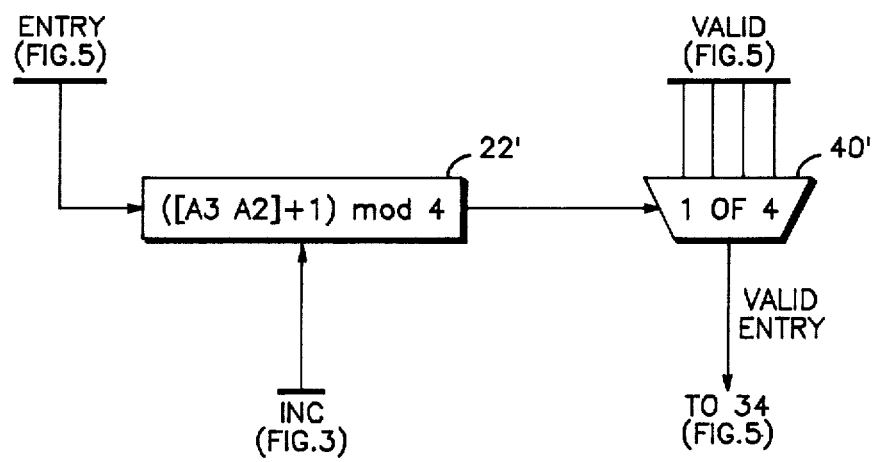
FIG. 6 illustrates a modified form of the burst initiation logic of FIG. 5.

Shown in FIG. 6 is a modified form of the valid entry detection portion of the burst initiation logic 36 of FIG. 5. In the modified form, the ENTRY portion of the ACCESS ADDRESS is incremented by a second, modulo-m adder 22' in response to the INC signal (FIG. 3), and applied to a 1-of-4 multiplexor 40' to select the VALID bit of the ENTRY in the INDEXed cache 28 line "following" (modulo 4) the selected ENTRY. The resulting VALID ENTRY signal provided by the multiplexor 40' may be applied to the NAND gate 34 in place of, or in some logical combination with, the VALID ENTRY signal provided by the OR gate 40 (FIG. 5), so that the BRST signal will not be provided if the next EXTRY in the INDEXed cache line 28 is valid. In order to facilitate the burst filling of less than an entire cache line 28, however, the state diagram (FIG. 4) for the burst controller 24 (FIG. 3) must be modified somewhat, so that the termination of the BRST signal after the burst operation has commenced will force the burst controller 24 back to the initial state.

Figure 7:
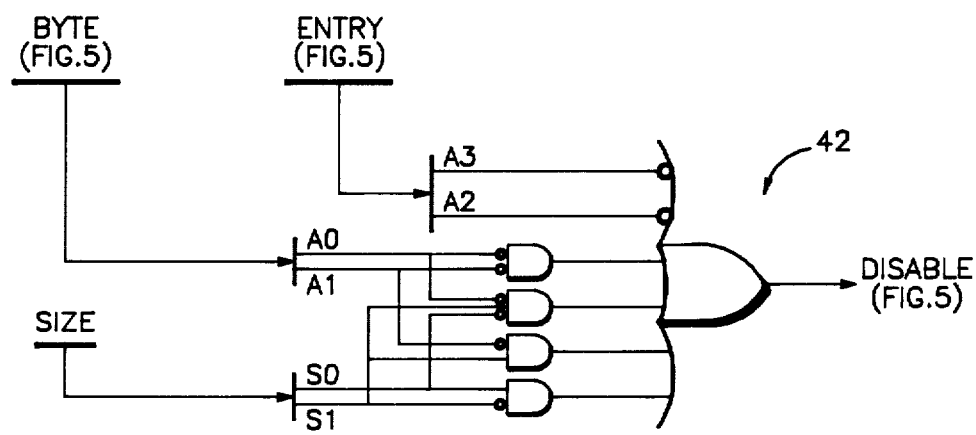
FIG. 7 illustrates the preferred form of the burst deferral logic.

In systems that allow the transfer and caching of misaligned or variable sized operands, the situation will arise wherein a requested operand will "span" more than one cache line 28, that is, the first part of the operand will be stored at the "end" of a cache line 28 having a given INDEX and the remainder of the operand will be stored at the "beginning" of the cache line 28 having an INDEX+1. In such situations, the burst initiation logic 36 of FIG. 5 may attempt to burst fill the entire INDEX cache line 28 before initiating the filling of the INDEX+1 cache line 28. Thus, the full operand may not be available until after the INDEX cache line 28 has been completely filled. To prevent this delay, burst deferral logic 42 such as that shown in FIG. 7 may be provided to selectively disable the AND gate 38 (FIG. 5) via a DISABLE signal. In the illustrated form, the burst deferral logic 42 will provide the DISABLE signal only if the ENTRY and BYTE select portions of the ACCESS ADDRESS (FIG. 5) and the operand SIZE signals (S1 and S0, encoded as in U.S. Pat. No. 4,633,437, for example) indicate that the requested operand will span two cache lines 28.

Although the present invention has been described herein in the context of a preferred embodiment, alternate embodiments may be made without departing from the spirit and scope of the present invention. For example, although only one purpose (burst deferral) has been described herein for the DISABLE signal (FIG. 5), this signal (or multiple DISABLE or ENABLE signals) may be used to prevent the burst start BRST signal whenever the burst mode of operation is selectively disabled, the cache 26 is itself selectively disabled or "frozen", or the operand itself is non-cacheable for some reason. Similarly, other criteria may be found to be desirable or preferable for generating the VALID ENTRY signal (FIGS. 5 and 6), based upon the VALID contents of the INDEXed cache line 28. In some circumstances, other considerations, such as the unreasonably slow response time of the memory, excessive transfer activity on the bus, or excessive or unusual cache activity, might be used effectively to selectively the generation of the burst start BRST signal using appropriate logic.

What is claimed is:

1. In a bus master for use with a memory capable of transferring operands in bursts in response to a burst request signal provided by the bus master, the bus master comprising:

a cache for storing a plurality of said operands in each of a plurality of cache lines;

cache control means for accessing said cache to determine if a selected operand is stored in said cache, and providing a cache hit signal if the selected operand is stored in said cache;

burst deferral means for determining that an operand to be transferred will span a plurality of said cache lines, and providing a burst deferral signal in response thereto; and burst control means for providing said burst request signal to the memory unless the cache control means provides the cache hit signal or the burst deferral means provides the burst deferral signal.

2. The bus master of claim 1 wherein the burst control means is selectively prevented from providing said burst request signal to said memory in response to a disable signal.

* * * * *